(12) United States Patent
Manabe

(10) Patent No.: US 7,542,123 B2
(45) Date of Patent: Jun. 2, 2009

(54) BOARD DEVICE AND LIQUID CRYSTAL DISPLAY DEVICE

(75) Inventor: Atsuyuki Manabe, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 320 days.

(21) Appl. No.: 11/516,649

(22) Filed: Sep. 7, 2006

(65) Prior Publication Data

US 2007/0085965 A1  Apr. 19, 2007

(30) Foreign Application Priority Data

Oct. 18, 2005  (JP) .............................. 2005-302966

(51) Int. Cl.
*G02F 1/1339* (2006.01)
(52) U.S. Cl. ...................... 349/153; 349/155
(58) Field of Classification Search ................. 349/153, 349/155
See application file for complete search history.

(56) References Cited

U.S. PATENT DOCUMENTS

| | | | | |
|---|---|---|---|---|
| 7,202,931 B2 * | 4/2007 | Chung et al. | ................. | 349/153 |
| 7,369,206 B2 * | 5/2008 | Inoue et al. | ................. | 349/153 |
| 2003/0223030 A1 * | 12/2003 | Byun et al. | ................. | 349/187 |

FOREIGN PATENT DOCUMENTS

| | | |
|---|---|---|
| JP | 2000-241803 | 9/2000 |
| JP | 2001-13489 | 1/2001 |
| JP | 2002-49045 | 2/2002 |
| JP | 2003-21818 | 1/2003 |
| JP | 2003-43501 | 2/2003 |

* cited by examiner

*Primary Examiner*—Charlie Peng
(74) *Attorney, Agent, or Firm*—Oblon, Spivak, McClelland, Maier & Neustadt, P.C.

(57) ABSTRACT

Main body groove portions are formed along the longitudinal direction on the surface of a spacer height adjusting layer provided on a margin area of a large-size glass substrate. The cross-sectional area between seal materials between image display areas is increased. An air discharge efficiency from the inside of the image display area between the large-size glass substrates can be enhanced. The air discharge from the inside of the imaged is play area can be further reliably and readily performed. Liquid crystal composition can be readily injected from a liquid crystal injection port into the image display area. The time required to inject the liquid crystal into the image display area can be shortened. The productivity of liquid crystal panels can be enhanced.

9 Claims, 4 Drawing Sheets

BOARD DEVICE AND LIQUID CRYSTAL DISPLAY DEVICE

INCORPORATION BY REFERENCE

The present application claims priority under 35 U.S.C. §119 to Japanese Patent Application No. 2005-302966 filed on Oct. 18, 2005. The content of the application is incorporated herein by reference in its entirety.

FIELD OF THE INVENTION

The present invention relates to a board device and a liquid crystal display device in which a second substrate is arranged in counterposition to a first substrate.

BACKGROUND OF THE INVENTION

A liquid crystal display device as this type of board device is equipped with an array substrate and a counter substrate each of which has an orientation film, and the array substrate and the counter substrate are disposed so that the orientation films thereof are in counterposition to each other. A liquid crystal layer is sandwiched in the cell gap between the orientation film of the array substrate and the orientation film of the counter substrate. A seal material and a sealing material are disposed on the peripheral areas of the array substrate and the counter substrate so as to bond the array substrate and the counter substrate to each other, and a spacer for holding the interval distance between the array substrate and the counter substrate is further disposed between the array substrate and the counter substrate. The spacer is formed of resin by a photolithographic method.

On the other hand, in order to enable this type of liquid crystal display device to perform color display, a colored layer composed of Red (R), Green (G) and Blue (B) is laminated between the array substrate and the counter substrate of the liquid crystal device. Furthermore, when the array substrate and the counter substrate are bonded to each other, the seal material is coated so as to surround an image display area between the array substrate and the counter substrate and can perform image display. Furthermore, after the array substrate and the counter substrate are bonded to each other via the seal material, the array substrate and the counter substrate are heated up to a temperature at which the seal material is hardened while pressure is applied to the array substrate and the counter substrate to crush the seal material. As a result, the array substrate and the counter substrate are bonded to each other. At this time, an ultraviolet ray may be irradiated to the seal material to harden the seal material.

As a method for applying pressure to the array substrate and the counter substrate, a batch treatment method for stacking a plurality of panels each of which has the array substrate and the counter substrate bonded by the seal material and then a load is applied to the stacked panels to crush the seal material, or a sheet type treatment method for placing an individual panel under vacuum atmosphere to remove air from the inside of each panel and then exposing the panel to atmospheric air to apply a load to the array substrate and the counter substrate of the panel as disclosed in Japanese Laid-Open Patent Publication No. 2002-049045 is known.

However, when the array substrate and the counter substrate are bonded to each other according to the above-described sheet type treatment method, it is required to release air from the image display area surrounded by the seal material coated between the array substrate and the counter substrate. In general, when as large a number of liquid crystal display devices as possible are cut out and formed from one large motherboard, efficiency is higher as the interval between the image display areas of these liquid crystal devices is smaller.

If the interval is excessively small, the air release efficiency from the image display area is reduced, and thus an air discharge time must be increased. Therefore, there is a risk that the production efficiency of the liquid crystal devices may be reduced. Furthermore, the cell gap between the array substrate and the counter substrate may be deviated and uniformity of the cell gap cannot be kept because air is not released from a part of the image display area, so that the productivity and display characteristics of the liquid crystal devices may be lowered.

The present invention has been made in view of the above problems, and the object thereof is to provide a board device and a liquid crystal display device that can enhance the productivity and the display characteristics.

SUMMARY OF THE INVENTION

A board device of the present invention includes a first substrate, a second substrate arranged in counterposition to the first substrate, a plurality of seal materials that surround a partial area between the first substrate and the second substrate and bond the first substrate and the second substrate to each other, a height adjusting layer provided between the plurality of seal materials between the first substrate and the second substrate and a spacer that is provided on one principal surface of the height adjusting layer and keeps the interval between the first substrate and the second substrate, and the height adjusting layer is provided with recess-shaped main body groove portions extending along a longitudinal direction of the seal materials.

The height adjusting layer is provided between the first substrate and the second substrate between the plurality of seal materials that covers partial areas between the first substrate and the second substrate to bond the first substrate and the second substrate to each other. A recessed main body groove portion extending along the longitudinal direction of the seal materials is provided between the height adjusting layers. Furthermore, a spacer for holding the interval between the first substrate and the second substrate is provided on one principal surface of the height adjusting layer.

That is, the recessed main body groove portion extending along the longitudinal direction of the seal materials is provided between the height adjusting layers each of which is provided between the first substrate and the second substrate between the plurality of seal materials, and the height adjusting layers are provided with the spacer for holding the interval between the first substrate and the second substrate on one principal surface thereof. As a result, the cross-sectional area between the plurality of seal materials between the first substrate and the second substrate is increased by the main body groove portion. Accordingly, air can be further readily discharged from the gap between the first substrate and the second substrate surrounded by the seal materials, and also liquid material, etc. can be further readily injected into the gap between the first substrate and the second substrate surrounded by these seal materials, so that the productivity and display performance of the board device can be enhanced.

DETAILED DESCRIPTION OF THE PREFERRED EMBODIMENT

The construction of a first embodiment of a liquid crystal display device according to the present invention will be described with reference to FIGS. 1 to 4.

Figure 1:
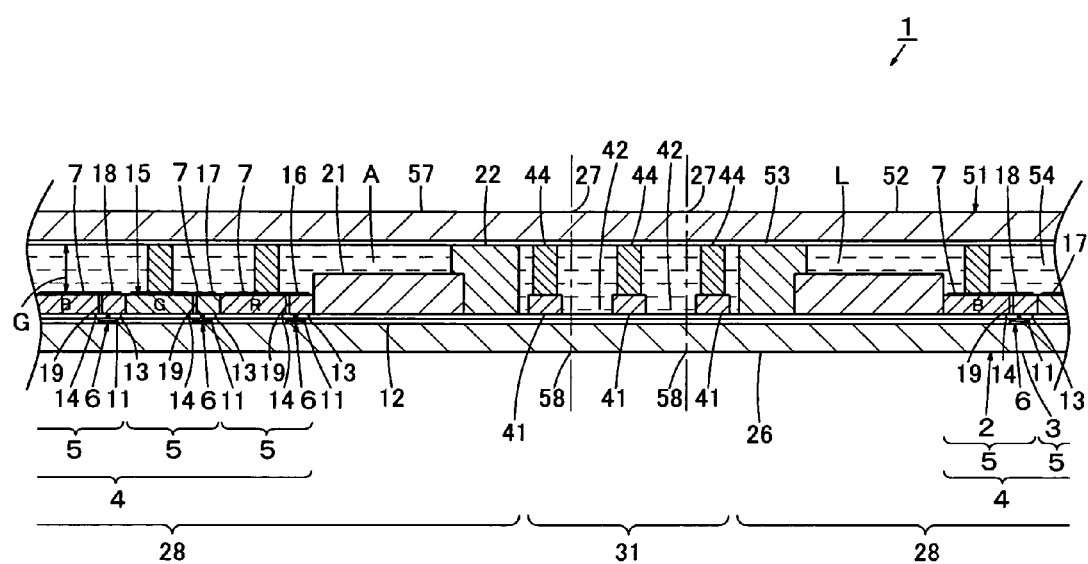
FIG. 1 is an explanatory cross-sectional view showing a part of a first embodiment of a board device according to the present invention.

In FIGS. 1 to 4, 1 denotes a liquid crystal panel as a board device, and the liquid crystal panel 1 is a liquid crystal display element as a liquid crystal display device which can perform color image display. The liquid crystal panel 1 is equipped with a substantially rectangular flat plate array substrate 2 as a color filter substrate corresponding to a first substrate. Furthermore, as shown in FIG. 1, the array substrate 2 has a glass substrate 3 as a transparent insulating substrate formed of a substantially rectangular flat translucent plate insulating substrate having translucency.

An image display area 4 as a display pixel area corresponding to a rectangular image display area which can perform image display is provided at the center portion on the surface corresponding to one principal surface of the glass substrate 3. Furthermore, on the image display area 4 of the glass substrate 3 are provided a plurality of scan lines (not shown) disposed along the width direction of the glass substrate 3 parallel to one another so as to be equally spaced from one another, and a plurality of signal lines (not shown) disposed along the longitudinal direction of the glass substrate 3 parallel to one another so as to be equally spaced from one another.

Furthermore, pixels 5 are provided in the respective areas divided and surrounded by the scan lines and the signal lines. These pixels 5 are arranged in a matrix form in the image display area 4 of the glass substrate 3. Each of the pixels 5 is provided with a thin film transistor (TFT) 6 as a switching element and a pixel electrode 7. Each pixel electrode 7 is electrically connected to the thin film transistor 6 in the same pixel 5, and controlled by the thin film transistor 6. Each thin film transistor 6 is provided at each portion at which each scan line and each signal line cross each other.

Here, a gate electrode 11 having electrical conductivity is laminated in each pixel 5 on the surface of the glass substrate 3. The gate electrode 11 is electrically connected to the scan line. Furthermore, a gate insulating film 12 is laminated on the surface of the glass substrate 3 so as to cover each gate electrode 11. The gate insulating film 12 is laminated on the entire surface of the glass substrate 3 so as to cover each gate electrode 11.

Furthermore, a source electrode 13 and a drain electrode 14 are laminated via an active layer as a semiconductor layer (not shown) in each pixel 5 on the surface of the gate insulating film 12. The source electrode 13 and the drain electrode 14 are provided so as to be in counterposition to the gate electrode 11 in the same pixel 5. The source electrode 13 is electrically connected to the signal line. Accordingly, the thin film transistor 6 is composed by the source electrode 13, the drain electrode 14, the gate electrode 11 and the active layer.

A color filter layer 15 as a colored layer is laminated on the gate insulating film 12 so as to cover each of the source electrode 13 and the drain electrode 14 in each pixel 5. The color filter layer 15 includes colored layers of three primary colors such as a red layer 16 colored with Red (R), a green layer 17 colored with Green (G) and a blue layer 18 colored with Blue (B) to implement color display. Here, the red layer 16, the green layer 17 and the blue layer 18 are successively laminated along the longitudinal direction of the glass substrate 3 on the gate insulating film 12 in the pixel 5 of the glass substrate 3 so as to extend in the width direction of the glass substrate 3, thereby being formed in a striped shape.

Furthermore, a contact hole 19 intercommunicating with the drain electrode 14 in each pixel 5 is provided in the color filter layer 15 of each pixel 5. The contact hole 19 is a through hole penetrating through the color filter layer 15 and conducting to the drain electrode 14. On the color filter layer 15 including the contact hole 19 in each pixel 5, a pixel electrode 7 performed by patterning an Indium Tin Oxide (ITO) film is laminated. The pixel electrode 7 is electrically connected to the drain electrode 14 in the same pixel 5 via the contact hole 19. An orientation film (not shown) for orienting a liquid crystal composition L in a liquid crystal layer 54 is laminated on the color filter layer 15 including the pixel electrode 7. The orientation film is formed by subjecting an orientation material such as polyimide to an orientation treatment.

On the other hand, a Black matrix (BM) layer 21 as a frame layer is laminated so as to cover and fringe the image display area 4 on the glass substrate 3 of the array substrate 2. The Black matrix layer 21 is formed of black resin having a light blocking property through which no light is transmitted, and it is designed in a rectangular frame shape surrounding the outer periphery of the image display area 4. Furthermore, a seal material 22 is coated at the outside of the Black matrix layer. 21 so as to cover and fringe the Black matrix layer 21. The seal material 22 covers the outer periphery of the Black matrix layer 21, and is also designed in a rectangular frame shape surrounding the image display area 4 on the glass substrate 3. That is, the seal material 22 is disposed along the outer periphery of the glass substrate 3.

Figure 2:
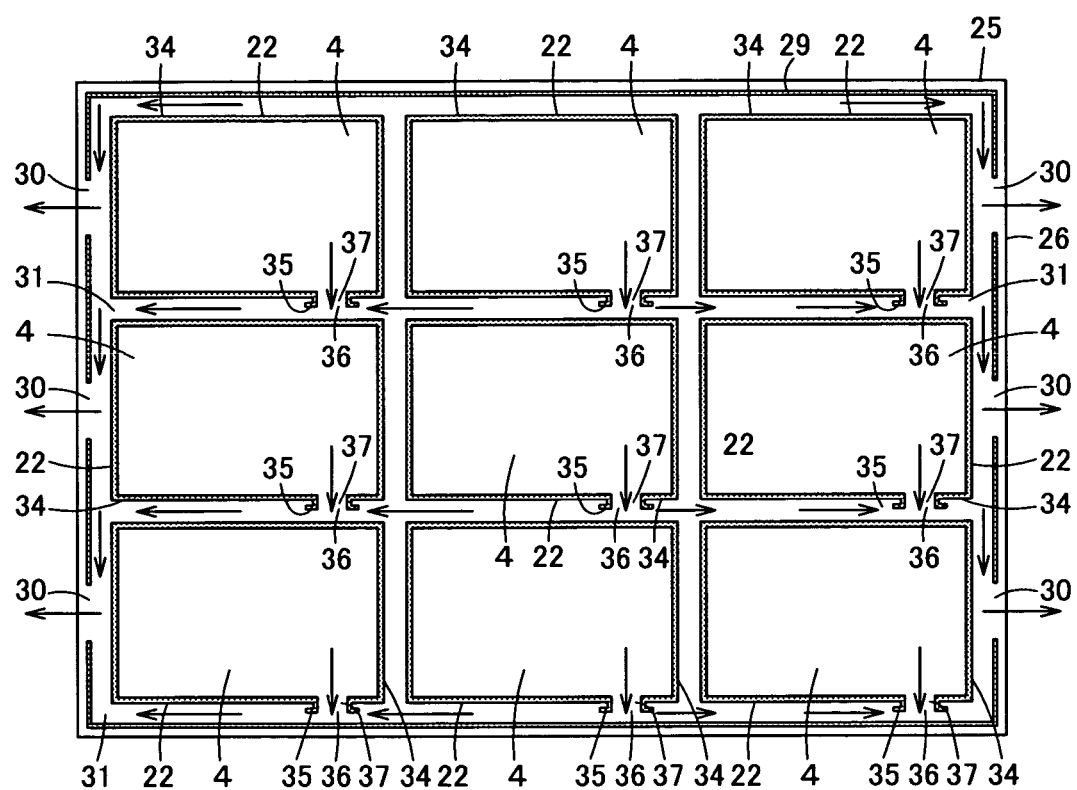
FIG. 2 is an explanatory plan view showing the board device.
Figure 3:
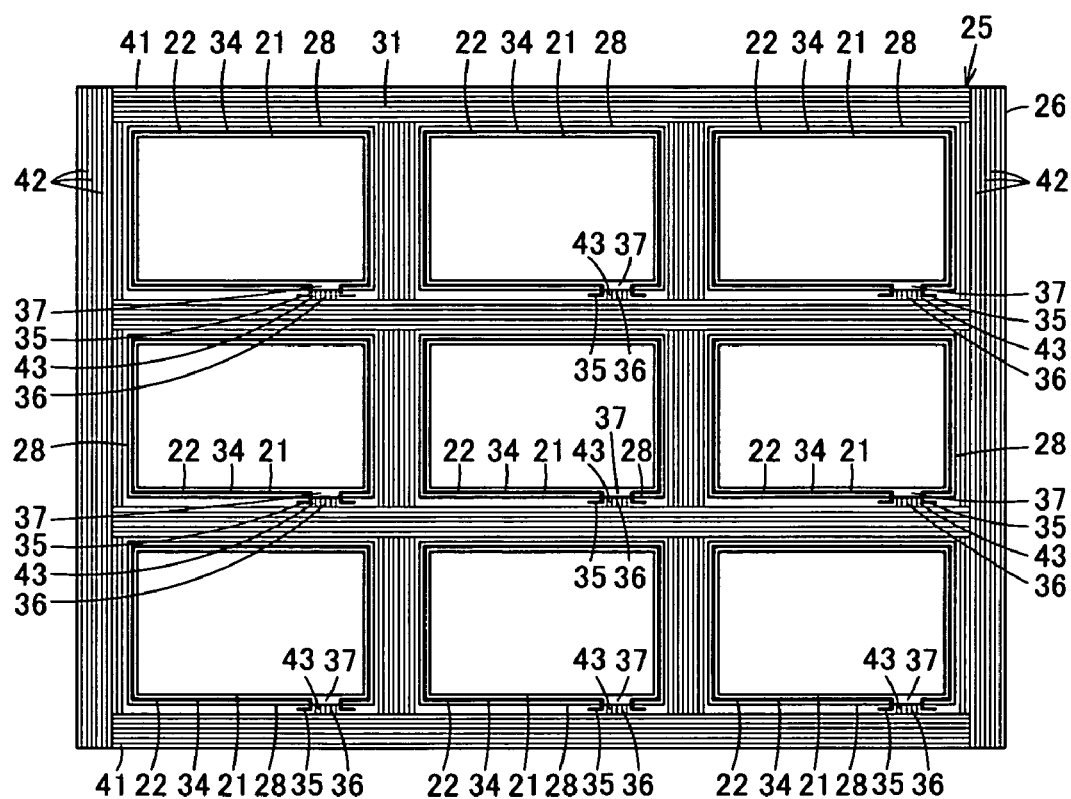
FIG. 3 is an explanatory plan view showing the board device.

Here, as shown in FIGS. 2 and 3, the array substrate 2 is formed by cutting out and dividing a large-size array substrate 25 corresponding to a motherboard as a first substrate every predetermined interval along the longitudinal direction and the width direction in conformity with the size of each array substrate 2. Specifically, the large-size array substrate 25 is a large-size flat plate substrate including a plurality of joined array substrates 2 in the longitudinal direction and the width direction, for example, three joined array substrates 2 in the longitudinal direction and three joined array substrates 2 in the width direction, a total of nine joined array substrates 2.

The large-size array substrate 25 includes a rectangular large-size flat plate glass substrate 26. The large-size glass substrate 26 is provided with grid-shaped divisional reference lines 27 extending along the longitudinal direction and the width direction of the large-size glass substrate 26 corresponding to the size of the glass substrate 3 of each array substrate 2. These divisional reference lines 27 are provided along the longitudinal direction and the width direction of the large-size glass substrate 26, and they correspond to chip cut-out positions provided along the outer peripheral edge of each area serving as the glass substrate 3 of each array substrate 2.

Furthermore, panel forming areas 28 as a total of nine rectangular chip arrangement areas which are partial areas sectioned by the divisional reference lines 27 on the surface of the large-size glass substrate 26 are provided. A rectangular frame-shaped outer peripheral seal material 29 is coated and laminated so as to surround each panel forming area 28 on the large-size glass substrate 26. The outer peripheral seal material 29 is formed along the outer peripheral edge of the large-size glass substrate 26. With respect to the outer peripheral seal material 29, no outer peripheral seal material 29 is partially coated at an intermediate portion of each of both end sides in the longitudinal direction of the outer peripheral seal material 29, thereby air flowing opening portions 30 for opening the outer peripheral seal material 29 are formed.

Furthermore, a margin area 31 as a peripheral area is provided at the inside from the outer peripheral seal material 29 on the surface of the large-size glass substrate 26 and at the outside from the respective panel forming areas 28 so as to fringe the respective panel forming areas 28. The margin areas 31 correspond to a margin portion of the large-size glass substrate 26 which is not sectioned by the divisional reference lines 27 in the longitudinal direction and the lateral direction. Accordingly, the margin area 31 is formed in a grid-shape between the respective panel forming areas 28 and at the outside of the respective panel forming areas 28.

The seal material 22 is coated in each panel forming area 28 on the surface of the large-size glass substrate 26 so as to extend along the outer peripheral edge of each panel forming area 28. The seal material 22 is continuously coated so as to fringe each panel forming area 28 on the surface of the large-size glass substrate 26. That is, the seal material 22 is provided so as not to protrude from each panel forming area 28 on the surface of the large-size glass substrate 26.

Specifically, the seal material 22 has a main body seal portion 34 that has a substantially rectangular frame shape in a top view and fringes a slightly inner portion from the outer peripheral edge of each panel forming area 28 of the large-size glass substrate 26. The main body seal portions 34 are formed in a matrix form on the large-size glass substrate 26 corresponding to the respective panel forming areas 28 on the large-size glass substrate 26. Furthermore, each of the main body seal portions 34 is formed in a substantially rectangular shape so as to surround substantially the center portion of each panel forming area 28 on the large-size glass substrate 26.

Furthermore, each of the main body seal portions 34 is integrally provided with an injection-port seal portion 35 as an opening portion for opening a place of each main body seal portion 34. The place concerned is set to be nearer to one side of the main body seal portion 34 than the center portion of the main body seal portion 34 in the longitudinal direction thereof on one side in the lateral direction of each main body seal portion 34. The injection-port seal portions 35 are projected outwardly from the one side in the lateral direction of the main body seal portion 34 at which the injection-port seal portions 35 concerned are provided.

The injection-port seal portions 35 are projected from one side in the lateral direction of each main body seal portion 34 along the lateral direction of each main body seal portion 34 by a predetermined distance and further projected in the opposite directions by a predetermined distance, thereby a tapered shape is formed. Accordingly, the portion opened by the injection-port seal portions 35 serves as a liquid crystal injection port 36 intercommunicating with the main body seal portion 34 from the injection-port seal portions 35. Furthermore, the injection-port seal portions 35 vertically project to one side in the lateral direction of the main body seal portion 34 in each panel forming area 28, and they have substantially the same length dimension as the width dimension of the main body seal portion 34.

Here, as shown in FIGS. 1 and 3, a spacer height adjusting layer 41 as a dummy colored layer which is not related to the image display of the liquid crystal panel 1 is laminated in the margin area 31 of the large-size glass substrate 26. Accordingly, the spacer height adjusting layer 41 is laminated in a grid-form on the large-size glass substrate 26. That is, the spacer height adjusting layer 41 is provided between the seal materials 22 of each glass substrate 3. Furthermore, the spacer height adjusting layer 41 is a dummy colored layer which is formed of the same material as the red layer 16 of the color filter layer 15 laminated on each glass substrate 3 of the large-size glass substrate 26 in the same process. Accordingly, the spacer height adjusting layer 41 has the same thickness as the red layer 16.

Furthermore, a plurality of recessed main body grooves 42 of 100 μm in width at a rate of one groove per 500 μm, for example, are provided between the spacer height adjusting layers 41 so as to extend in the longitudinal direction of the spacer height adjusting layer 41. These main body groove portions 42 are formed in a recessed-groove shape in cross section so as to extend along the longitudinal direction of the seal material 22 which is provided so as to be adjacent to a part of the spacer height adjusting layer 41 provided with these main body groove portions 42. That is, these main body groove portions 42 are provided substantially parallel to the width direction corresponding to the short side of the glass substrate 3. Accordingly, these main body groove portions 42 are formed so as to have a substantially regular striped structure.

Furthermore, these main body groove portions 42 are formed by patterning the spacer height adjusting layer 41, and it is formed by removing a part of the spacer height adjusting layer 41 along the longitudinal direction. Accordingly, the main body groove portions 42 have the depth equal to the thickness dimension of the spacer height adjusting layer 41. Furthermore, the main body groove portions 42 are provided at equal intervals in the width direction of the spacer height adjusting layer 41. That is, these main body groove portions 42 are provided to widen the cross-sectional space between the seal materials 22.

Figure 4:
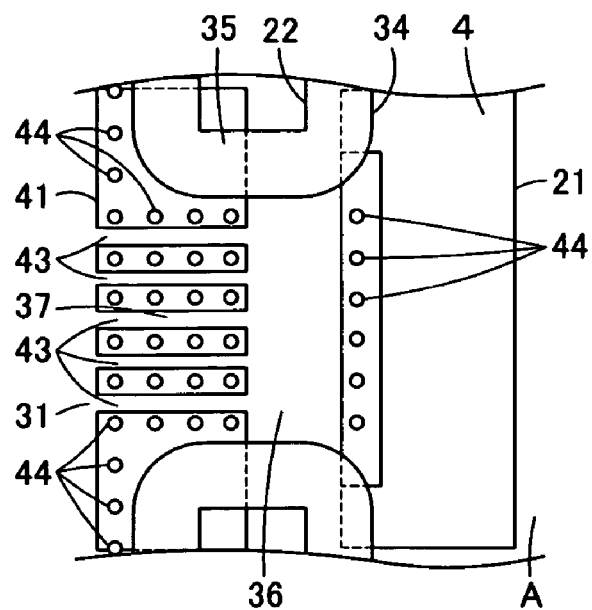
FIG. 4 is an explanatory plan view showing a part of the board device.

As shown in FIG. 4, a liquid crystal injection portion 37 corresponding to a portion of the spacer height adjusting layer 41 which faces the liquid crystal injection port 36 of each injection-port seal portion 35 is provided with a plurality of opening groove portions 43 each having a recess groove shape in cross section, for example, grooves of 100 μm in width at a rate of one groove per 500 μm, and the grooves extend along the opening direction corresponding to the direction in which the liquid crystal injection port 36 is opened. The opening groove portions 43 are provided between the spacer height adjusting layers 41 and also along the width direction of the spacer height adjusting layer 41, and also provided on the spacer height adjusting layer 41 located between the liquid crystal injection ports 36. Furthermore, the opening groove portions 43 are spaced from one another at equal intervals along the longitudinal direction of the spacer height adjusting layer 41.

Furthermore, the opening groove portions 43 are also formed by patterning the spacer height adjusting layer 41, and they are formed by removing a part of the spacer height adjusting layer 41 in the width direction. Accordingly, these opening groove portions 43 also have the depth dimension equal to the thickness dimension of the spacer height adjusting layer 41. That is, these opening groove portions 43 are provided so as to intercommunicate with an area at which the opening groove portions 43 are located and which is surrounded by the seal material 22 in order to facilitate injection of the liquid crystal composition L and discharge of air from the liquid crystal injection port 36, and also provided to widen the cross-sectional space of the liquid crystal injection port 36.

A plurality of columnar spacers 44 as spacer columns formed of transparent resin are laminated on the spacer height adjusting layer 41 excluding the opening groove portions 43 and the main body groove portions 42. These columnar spacers 44 are laminated on the spacer height adjusting layer 41 and also on each of the green layer 17 and the red layer 16 of each glass substrate 3 of the large-size glass substrate 26. Accordingly, the height of each of these columnar spacers 44 is adjusted by the spacer height adjusting layer 41. Furthermore, these columnar spacers 44 are formed to have a smaller width dimension than the width dimension of the spacer height adjusting layer 41 between each main body group 42 and each opening groove portion 43.

After the large-size glass substrate 26 of the large-size array substrate 25 is divided corresponding to the glass substrate 3 of each array substrate 2, a counter substrate 51 is secured to the surface of each glass substrate 3 in a counter-position. That is, the array substrate 2 and the counter substrate 51 are arranged while the cell gap G corresponding to the interval between the array substrate 2 and the counter substrate 51 is kept at a predetermined interval by the columnar spacers 44 and the spacer height adjusting layer 41, and adhesively bonded to each other by the seal material 22. At this time, the cell gap G between the array substrate 2 and the counter substrate 51 is kept by the columnar spacers 44 and the spacer height adjusting layer 41.

As shown in FIG. 1, the counter substrate 51 is equipped with a glass substrate 52 corresponding to a transparent substrate as a rectangular flat plate translucent substrate that has a slightly smaller lateral dimension than that of the glass substrate 3 of the array substrate 2 and also a slightly smaller longitudinal dimension than that of the glass substrate 3. The glass substrate 52 is bonded to the glass substrate 3 while one side in the lateral direction of the glass substrate 52 is made coincident with one side in the lateral direction of the glass substrate 3 of the array substrate 2 and also one end in the longitudinal direction of the glass substrate 52 is made coincident with one end in the longitudinal direction of the glass substrate 3 of the array substrate 2.

A counter electrode 53 corresponding to a conductive film as a film member formed of Indium Tin Oxide (ITO) film is laminated on the entire surface of one principal surface of the glass substrate 52. Furthermore, an orientation film (not shown) for orienting the liquid crystal composition L in the liquid crystal layer 54 is laminated on the surface of the counter electrode 53. The orientation film is also formed by subjecting orientation material such as polyimide to an orientation treatment. The orientation film is brought into contact with the seal material 22 on the array substrate 2 while the array substrate 2 and the counter substrate 51 are bonded to each other via the seal material 22, thereby the seal material 22 is adhered to the surface of the orientation film.

Furthermore, the area which is located inside the seal material 22 between the array substrate 2 and the counter substrate 51 and adjusted in height by the columnar spacers 44 and the space height adjusting layer 41 serves as a liquid crystal sealing area A. The liquid crystal composition L is injected from the liquid crystal injection port 36 of the seal material 22 between the array substrate 2 and the counter substrate 51 into the liquid crystal sealing area A, thereby a liquid crystal layer 54 as an optical modulation layer is formed while being sandwiched between the array substrate 2 and the counter substrate 51. The liquid crystal layer 54 is formed by injecting the liquid crystal composition L into the liquid crystal sealing area A between the array substrate 2 and the counter substrate 51. That is, the liquid crystal layer 54 is interposed and filled between the array substrate 2 and the counter substrate 51. Under the state that the liquid crystal layer 54 is interposed in the liquid crystal sealing area A between the array substrate 2 and the counter substrate 51, the liquid crystal injection port 36 of the seal material 22 between the array substrate 2 and the counter substrate 51 is filled and sealed with sealing material 55 as ultraviolet curable resin. Here, the liquid crystal composition L is formed of nematic liquid crystal material added with chiral material, etc., for example.

Here, each counter substrate 51 is also formed by cutting out and dividing a large-size counter substrate 56 corresponding to a motherboard as a second substrate at every predetermined interval in the longitudinal direction and the width direction corresponding to the size of each counter substrate 51. Specifically, the large-size counter substrate 56 is a large-plate board including a plurality of joined counter substrates 51 in the longitudinal direction and the width direction, for example, three joined counter substrates 51 in the longitudinal direction and three joined counter substrates 51 in the width direction, a total of nine joined counter substrates 51.

The large-size counter substrate 56 is equipped with a rectangular flat-plate large-size glass substrate 57 as a second substrate. The large-size glass substrate 57 is provided with grid-shaped divisional reference lines 58 along the longitudinal direction and the width direction of the large-size glass substrate 57 corresponding to the size of the glass substrate 52 of each counter substrate 51. The divisional reference lines 58 are provided along the divisional reference lines 27 on the large-size glass substrate 26 of the large-size array substrate 25. Accordingly, a total of nine panel forming areas 28 are provided on the surface of the large-size glass substrate 57 of the large-size counter substrate 56 as in the case of the large-size glass substrate 26 of the large-size array substrate 25, and also a margin area 31 is provided so as to fringe each panel forming area 28.

On the other hand, a polarization plate (not shown) is laminated and bonded to the outside surface corresponding to the other principal surface of each of the array substrate 2 and the counter substrate 51 of the liquid crystal panel 1.

Next, a method for manufacturing the liquid crystal panel according to the above-described first embodiment will be described.

First, the scan line, the signal line and the thin film transistor 6 are formed in each image display area 4 on the large-size glass substrate 26 as the large-size array substrate 25.

Thereafter, red resist liquid is spin-coated on the image display area 4 on the large-size glass substrate 26 so as to cover each of the scan line, the signal line and the thin film transistor 6, and subjected to preliminary baking, so-called pre-baking for approximately 5 minutes at a temperature of approximately 90° C. Thereafter, for example, ultraviolet light of 150 mJ/cm$^2$ in intensity is irradiated and exposed via a predetermined mask pattern.

Subsequently, the exposed red resist is developed for approximately 40 seconds by using Tetramethylammonium hydroxide (TMAH) water solution of approximately 0.1 mass % and then washed with water.

Furthermore, the red resist washed with water is subjected to main baking, so-called post-baking for approximately one hour at a temperature of approximately 200° C., thereby the red layer 16 and the spacer height adjusting layer 41 having the main body groove portion 42 and the opening groove portion 43 are simultaneously formed on a predetermined position of the image display area 4 on the large-size glass substrate 26.

Thereafter, the green layer 17 and the blue layer 18 are formed in each image display area 4 on the large-size glass substrate 26 with green resist and blue resist respectively according to the same method as the red layer 16 and the spacer height adjusting layer 41, thereby the color filter layer 15 is formed in each image display area 4.

Furthermore, an ITO film is laminated on the color filter layer 15 according to a sputtering method, and then patterned to form the pixel electrode 7.

Thereafter, a Black matrix layer 21 is formed on the large-size glass substrate 26 by using black resin according to the same method as the formation of the color filter layer 15, and then the columnar spacers 44 are formed on the large-size glass substrate 26 by using transparent resin.

Subsequently, orientation material formed of polyimide is coated on the entire surface of each image display area 4 of the large-size glass substrate 26 on which the columnar spacers 44 and the Black matrix layer 21 are formed, and then subjected to the orientation treatment, thereby the large-size array substrate 25 is formed.

On the other hand, with respect to the large-size counter substrate 56, an ITO film is laminated on each image display area 4 of the large-size glass substrate 57 of the large-size counter substrate 56 according to the sputtering method to form the counter electrode 53.

Thereafter, orientation material formed of polyimide is coated on the entire surface of each image display area 4 including the counter electrode 53 and then subjected to the orientation treatment to form the orientation film, thereby the large-size counter substrate 56 is formed.

Subsequently, the seal material 22 is coated so as to cover and fringe each image display area 4 of the large-size glass substrate 57 of the large-size counter substrate 56, and also the outer peripheral seal material 29 is coated along the outer peripheral edge of the margin area 31 of the large-size glass substrate 57.

Thereafter, the large-size glass substrates 26 and 57 are bonded to each other by the seal material 22 and the outer peripheral seal material 29 under the state that the orientation film of the large-size glass substrate 57 and the orientation film of the large-size glass substrate 26 of the large-size array substrate 25 are in counterposition to each other.

Subsequently, the large-size glass substrates 26 and 57 bonded to each other by the seal material 22 and the outer peripheral seal material 29 are fed into a sheet-type sealing and fixing jig and then evacuated to discharge air. Thereafter, the large-size glass substrates 26 and 57 are baked for approximately 30 minutes at a hardening temperature of approximately 170° C., and the liquid crystal sealing area A is formed in each image display area between the large-size glass substrates 26 and 57.

Furthermore, the large-size glass substrates 26 and 57 are cut out along the respective divisional reference lines 27 and 58 to form empty liquid crystal panels 1.

Thereafter, nematic liquid crystal material added with chiral material is vacuum-injected from the liquid crystal injection port 36 of each liquid crystal panel 1 into the liquid crystal sealing area A of the liquid crystal panel 1. Thereafter, each liquid crystal injection port 36 of each liquid crystal panel 1 is coated with ultraviolet curable resin as the sealing material 55, and exposed to an ultraviolet ray to be cured, thereby the liquid crystal panel 1 having the liquid crystal layer 54 formed between the array substrate 2 and the counter substrate 51 is formed.

Subsequently, a polarization plate is disposed on each of the outside surface of the array substrate 2 and the outside surface of the counter substrate 51 of each liquid crystal panel 1 to complete the liquid crystal panels 1.

As described above, according to the first embodiment, the main body groove portions 42 having the recessed groove shape in section extending along the longitudinal direction of the spacer height adjusting layer 41 are formed on the surface of the spacer height adjusting layer 41 provided on the margin area 31 of the large-size glass substrate 26 before the large-size glass substrate 26 is divided. Furthermore, the opening groove portions 43 extending along the opening direction of the liquid crystal injection ports 36 are formed at the liquid crystal injection portion 37 corresponding to the portion of the spacer height adjusting layer 41 in counter position to the liquid crystal injection port 36 of each image display area 4.

As a result, the cross-sectional area of the space between the surface of the spacer height adjusting layer 41 and the surface of the large-size glass substrate 57 between the seal materials 22 located between the respective image display areas 4 and the cross-sectional area of the space between the surface of the spacer height adjusting layer 41 and the surface of the large-size glass substrate 57 at the liquid crystal injection portion 37 of each image display area 4 can be widened by forming the main body groove portions 42 and the opening groove portions 43. Accordingly, the air discharging efficiency from the inside of each image display area 4 surrounded by the seal materials 22 between the large-size glass substrates 26 and 57 can be enhanced, and thus the air discharge from the image display areas 4 can be further reliably and readily performed. Furthermore, the injection of the liquid crystal composition L from the liquid crystal injection port 36 into the image display area 4 surrounded by the seal materials 22 can be readily performed, so that the time required to inject the liquid crystal into the image display area 4 can be shortened.

Accordingly, the production efficiency can be prevented from being lowered due to a long time required to discharge air from the inside of the image display area 4 surrounded by the seal material 22, and thus the productivity of the liquid crystal panel 1 can be enhanced because the air discharge time is shortened. Furthermore, the deviation of the cell gap G between the large-size glass substrates 26 and 57 and the degradation in uniformity of the cell gap due to insufficient air discharge from the inside of the image display area 4 surrounded by the seal material 22 can be prevented, and thus the degradation in image quality of the liquid crystal panel 1 due to the degradation in uniformity of the cell gap G can be improved.

Specifically, as compared with the case where neither main body groove portion 42 nor opening groove portion 43 is provided on the spacer height adjusting layer 41 between the large-size glass substrates 26 and 57, even when the time of the air discharge from the inside of each image display area 4 between the large-size glass substrates 26 and 57 after the large-size glass substrates 26 and 57 are bonded to each other by the seal material 22 is shortened by approximately 5 minutes, a sufficient load can be applied between the large-size glass substrates 26 and 57, and also the uniformity of the cell gap G between the large-size glass substrates 26 and 57 can be enhanced, so that there is no occurrence of display failure of the liquid crystal panel 1 due to unevenness of the cell gap G.

The green layer 17 and the blue layer 18 may be appropriately used as the spacer height adjusting layer 41. However, it is preferable to use the red layer 16 because the red layer 16 is most stable in workability.

Figure 5:
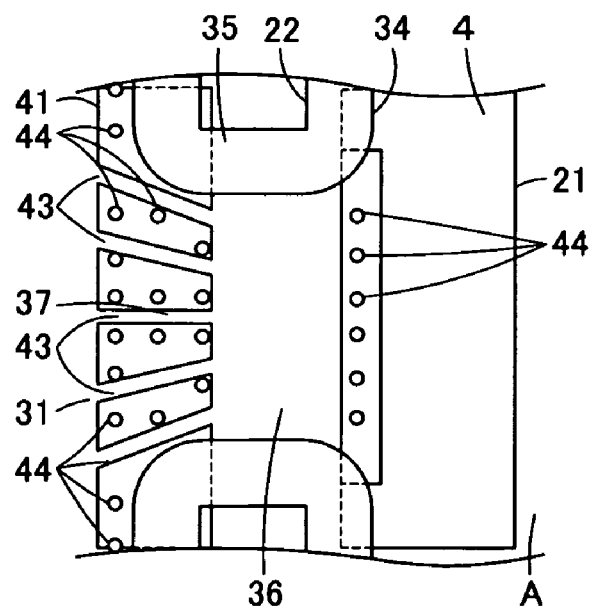
FIG. 5 is an explanatory plan view showing a part of a second embodiment of the board device according to the present invention.

In the first embodiment described above, the opening groove portions 43 extending along the opening direction of the liquid crystal injection port 36 are formed at the liquid crystal injection portion 37 of the spacer height adjusting layer 41 between the large-size glass substrates 26 and 57. However, as in the case of the second embodiment shown in FIG. 5, opening groove portions 43 radially expanding in the opening direction of the liquid crystal injection port 36 may be formed at the liquid crystal injection portion 37 of each image display area 4. The opening groove portions 43 are formed so as to equally radially expand in the opening direction of the liquid crystal injection port 36 by centering around the center in the width direction of the base end edge of the liquid crystal injection port 36.

Specifically, the opening groove portions 43 are formed by grooves of 100 μm in width at a rate of approximately one groove per 500 μm are formed between the liquid crystal injection ports 36. The opening groove portions 43 are provided between the liquid crystal injection ports 36 so as to be equally spaced from one another along the width direction of the liquid crystal injection ports 36. Furthermore, the opening groove portions 43 are formed by providing radially expanding portions to a mask pattern used when the spacer height adjusting layer 41 is patterned.

Furthermore, the opening groove portion 43 located at the center in the width direction among the opening groove portions 43 is formed along the opening direction of the liquid crystal injection port 36. Each of the opening groove portions 43 located at both sides in the width direction among the opening groove portions 43 is formed in a tapered shape inclined at a predetermined angle with respect to the opening groove portion 43 at the center. The intermediate opening groove portions 43 located between the center opening groove 43 and each of the opening groove portions 43 located at both sides are formed in a tapered shape inclined at a predetermined angle with respect to each of the center opening groove portions 43 and the opening groove portions 43 at both sides. Accordingly, these intermediate opening groove portions 43 are inclined at a substantially half gradient angle of the gradient angle of the opening groove portions 43 at both sides with respect to the center opening groove portions 43.

As a result, the opening groove portion 43 is formed in the spacer height adjusting layer 41 of the liquid crystal injection portion 37, thereby the cross-sectional area at the liquid crystal injection portion 37 of each image display area 4 can be widened. Therefore, the same action and effect as the first embodiment can be achieved. Furthermore, the opening groove portions 43 are formed so as to radially expand in the opening direction of the liquid crystal injection port 36. Therefore, when air is discharged from the inside of each image display area 4, air inside the image display area 4 can be discharged while being diffused through the radially expanded opening groove portions 43. In addition, when the liquid crystal composition L is injected into the image display area 4, the liquid crystal composition L can be injected while being collected to the opening groove portions 43.

Accordingly, the air discharge efficiency from the inside of the image display area 4 can be enhanced, and also the liquid crystal composition L can be readily injected from the liquid injection port 36 into the image display area 4. Specifically, as compared with the case where neither main body groove portion 42 nor opening groove portion 43 is provided on the spacer height adjusting layer 41, the air discharge time required to discharge air from the inside of each image display area 4 between the large-size glass substrates 26 and 57 after the large-size glass substrates 26 and 57 are bonded to each other by the seal material 22 can be shortened by approximately ten minutes.

In each of the above-described embodiments, each of the color filter layer 15 and the spacer height adjusting layer 41 is formed on the large-size glass substrate 26 of the large-size array substrate 25. However, the color filter layer 15 and the spacer height adjusting layer 41 may be formed on the large-size glass substrate 57 of the large-size counter substrate 56. Furthermore, the liquid crystal panel 1 uses the thin film transistor 6 as a switching element. However, a liquid crystal panel 1 using a switching element such as a thin film diode (TFD), etc., inplace of the thin film transistor 6, or another flat display device or board device may be applied to the present invention.

What is claimed is:

1. A board device comprising:
a first substrate;
a second substrate arranged in counterposition to the first substrate;
a plurality of seal materials that surround a partial area between the first substrate and the second substrate and bond the first substrate and the second substrate to each other;
a height adjusting layer provided between the plurality of seal materials between the first substrate and the second substrate; and
a spacer that is provided on one principal surface of the height adjusting layer and keeps the interval between the first substrate and the second substrate,
wherein
the height adjusting layer is provided with recess-shaped main body groove portions extending along a longitudinal direction of the seal materials;
the seal material has opening portions for providing openings between the first substrate and the second substrate covered by the seal material; and
recess-shaped opening groove portions radially expanding in the opening direction of the opening portions are provided on the portions of the height adjusting layer in counterposition to the opening portions.

2. The board device according to claim 1, wherein the main body groove portions are provided to a part of the seal material adjacent to the height adjusting layer provided with the main body groove portions parallel to each other.

3. The board device according to claim 1, further comprising a colored layer provided on one principal surface of any one of the first substrate and the second substrate, wherein the height adjusting layer comprises the colored layer.

4. The board device according to claim 1, further comprising a colored layer provided on one principal surface of any one of the first substrate and the second substrate,
wherein the height adjusting layer is formed of the same material as the colored layer and simultaneously provided in the same process.

5. The board device according to claim 1, further comprising a colored layer provided on one principal surface of any one of the first substrate and the second substrate, wherein the height adjusting layer is provided at the same thickness as the colored layer.

6. The board device according to claim 1, wherein
the seal material has opening portions for providing openings between the first substrate and the second substrate covered by the seal material, and
recess-shaped opening groove portions extending along an opening direction of the opening portions are provided on the portions of the height adjusting layer in counterposition to the opening portions.

7. The board device according to claim 1, wherein the opening groove portions are provided to intercommunicate with the inside of an area surrounded by the seal material.

8. The board device according to claim 1, wherein the opening groove portions are provided to intercommunicate with the inside of an area surrounded by the seal material.

9. A liquid crystal display device comprising: the board device of claim 1, wherein the first substrate comprises a translucent substrate and a plurality of pixels provided in a matrix form on the translucent substrate; the second substrate is arranged in counterposition to the translucent substrate and a liquid crystal layer interposed between the first substrate and the second substrate of the board device.

* * * * *